United States Patent
Urano et al.

(10) Patent No.: US 7,362,900 B2
(45) Date of Patent: Apr. 22, 2008

(54) APPARATUS AND METHOD FOR PROCESSING IMAGES, RECORDING MEDIUM, AND PROGRAM

(75) Inventors: Izumi Urano, Tokyo (JP); Natsuo Koda, Kanagawa (JP)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 10/779,629

(22) Filed: Feb. 18, 2004

(65) Prior Publication Data

US 2004/0223662 A1  Nov. 11, 2004

(30) Foreign Application Priority Data

Mar. 18, 2003  (JP)  ............... 2003-073073

(51) Int. Cl.
*G06K 9/48* (2006.01)
(52) U.S. Cl. .................. 382/199; 382/299; 382/266
(58) Field of Classification Search .............. 382/299, 382/199, 266; 358/3.02; 250/310, 492.3; 356/605
See application file for complete search history.

(56) References Cited

U.S. PATENT DOCUMENTS 6,798,542 B1 *  9/2004  Kimura et al. ............. 358/3.02

FOREIGN PATENT DOCUMENTS

| JP | 411142117 A | * | 5/1999 |
| JP | 02001082954 A | * | 3/2001 |
| JP | 02004022106 A | * | 1/2004 |

* cited by examiner

*Primary Examiner*—Anh Hong Do
(74) *Attorney, Agent, or Firm*—Oblon, Spivak, McClelland, Maier & Neustadt, P.C.

(57) ABSTRACT

An image input section outputs the size of an image to a division-number setting section and outputs the image to an edge enhancing section, which enhances the edges of the image. An edge extracting section extracts the edges, an edge evaluating section checks whether each pixel belongs to an edge, and an edge counting section outputs the frequencies of the edges. A DFT section applies a Fourier transform to the edge frequencies which are output as power spectra, and a peak extracting section outputs the spatial frequencies at the peaks of the power spectra. A division-number setting section determines the number of divisions from the spatial frequencies. An image dividing section divides the image into the determined number of blocks and a colored-image output section assigns a particular pixel value to all pixels in each of the blocks.

9 Claims, 19 Drawing Sheets

FIG. 7A

| 0 | −1 | 0 |
|---|---|---|
| −1 | 5 | −1 |
| 0 | −1 | 0 |

FIG. 7B

| −1 | −1 | −1 |
|---|---|---|
| −1 | 9 | −1 |
| −1 | −1 | −1 |

FIG. 9A

| 0  | 1 |
|----|---|
| −1 | 0 |

FIG. 9B

| 1 | 0  |
|---|----|
| 0 | −1 |

FIG. 10A

| 0 | 0 | 0 |
|---|---|---|
| −1 | 0 | 1 |
| 0 | 0 | 0 |

FIG. 10B

| 0 | −1 | 0 |
|---|---|---|
| 0 | 0 | 0 |
| 0 | 1 | 0 |

FIG. 11A

| -1 | 0 | 1 |
|---|---|---|
| -1 | 0 | 1 |
| -1 | 0 | 1 |

FIG. 11B

| -1 | -1 | -1 |
|---|---|---|
| 0 | 0 | 0 |
| 1 | 1 | 1 |

FIG. 12A

| -1 | 0 | 1 |
|---|---|---|
| -2 | 0 | 2 |
| -1 | 0 | 1 |

FIG. 12B

| -1 | -2 | -1 |
|---|---|---|
| 0 | 0 | 0 |
| 1 | 2 | 1 |

APPARATUS AND METHOD FOR PROCESSING IMAGES, RECORDING MEDIUM, AND PROGRAM

BACKGROUND OF THE INVENTION

1. Field of the Invention

The present invention relates to an apparatus and a method for processing images, a recording medium, and a program. In particular, the present invention relates to an apparatus, a method, a recording medium, and a program for converting an image into a low-resolution image which is still recognizable to the human visual sense.

2. Description of the Related Art

An image conversion technique for reducing image resolution is well known. Image mosaicing, one of such resolution-reduction techniques, is outlined as follows. An input image is divided into two or more blocks and then all pixels in each block are assigned a representative pixel value determined based on at least one of the pixels in the block.

FIG. 1 shows the structure of a known image converting section 1, which includes an image input section 11, a division-number setting section 12, an image-dividing section 13, and a colored-image output section 14.

The image input section 11 acquires an input image, detects the image size (the number of pixels in the horizontal direction and the number of pixels in the vertical direction), and outputs the image size to the division-number setting section 12. Along with the processing described above, the image input section 11 analyses the input image into red, green, and blue (RGB) signals, which are also passed to the division-number setting section 12 as brightness values. The image input section 11 also outputs the input image to the image-dividing section 13.

The division-number setting section 12 determines the numbers of divisions of the input image in the horizontal direction and vertical direction based on the received image size of the input image. In more detail, the division-number setting section 12 determines the numbers of horizontal and vertical divisions of the input image based on the received image size plus a predetermined size (the number of pixels in the horizontal direction and the number of pixels in the vertical direction) of a block which is the constitutional unit of a mosaic image to be produced from the input image. The numbers of divisions thus calculated are output to the image-dividing section 13.

The image-dividing section 13 divides the input image in the horizontal direction and the vertical direction according to the respective numbers of divisions received from the division-number setting section 12, and outputs the image divided into blocks to the colored-image output section 14.

The colored-image output section 14 assigns the value of the pixel at the center of gravity in each block (representative value as a brightness value) to all pixels in the block.

In short, the colored-image output section 14 assigns the representative value thus determined to all pixels in each block to cause all pixels in the block to have the same pixel value. As a result, the input image is divided into a particular number (at least two) of blocks such that the resultant image is a low-resolution mosaic image with a uniform color in each block.

FIG. 2 is a flowchart describing image conversion by the known image converting section 1.

In step S1, the image input section 11 acquires an input image, detects the image size, and outputs the image size to the division-number setting section 12. Furthermore, the image input section 11 analyses the input image into red, green, and blue (RGB) signals, which are also passed to the division-number setting section 12 as brightness values. The image input section 11 also outputs the acquired input image as is to the image-dividing section 13.

In step S2, the division-number setting section 12 determines the numbers of divisions in the horizontal direction and vertical direction of the input image based on the received image size and the predetermined block size, and outputs the calculated numbers of divisions to the image-dividing section 13.

In step S3, the image-dividing section 13 divides the input image received from the image input section 11 along the horizontal direction and vertical direction according to the respective numbers of image divisions, and outputs an image which has been divided into blocks to the colored-image output section 14.

In step S4, the colored-image output section 14 processes the input image formed of blocks received from the image-dividing section 13 such as to assign the pixel value of the pixel at the center of gravity in each block (i.e., a representative pixel value in the block) to all pixels in the block, thus converting the input image to a low-resolution mosaic image.

In step S5, the image input section 11 determines whether the next input image is available; if the next input image is available, the flow control returns to step S1. In other words, steps S1 to S5 are repeated until no next input image is available.

When it is determined that no next input image is available in step S5, the processing flow ends.

In this manner, the processing in step S4 produces a low-resolution mosaic image composed of blocks, each assigned a uniform color.

In order to produce a mosaic image from an input image, the known image converting section 1 shown in FIG. 1 determines the numbers of divisions of the input image in the horizontal direction and vertical direction based on the block size predetermined irrespective of the input image. This approach produces a mosaic image which may not be recognizable depending on the block size.

By converting an input image to a mosaic image, the known resolution reduction technique is intended to make the input image unrecognizable. In other words, the known technique is not intended to produce a low-resolution mosaic image that is still recognizable to human beings.

SUMMARY OF THE INVENTION

In view of the background described above, an object of the present invention is to reduce the resolution of an input image, while still maintaining the resultant low-resolution image recognizable.

According to an aspect of the present invention, an image processing apparatus includes an edge-extracting section for extracting edges of an input image composed of pixels in a matrix; a period-detecting section for detecting the periods of the edges; a dividing section for dividing the input image into blocks according to the periods of the edges; and a pixel-value converting section for converting the pixel values of all pixels in each of the blocks to a predetermined pixel value.

The image processing apparatus may further include a frequency-detecting section for detecting the frequencies of pixels belonging to the edges extracted by the edge-extracting section in each of the horizontal and vertical directions of the matrix, wherein the period-detecting section detects the periods of the edges in each of the horizontal and vertical directions of the matrix based on the frequencies of the pixels.

The image processing apparatus may further include a discrete Fourier transforming section for applying a discrete Fourier transform to the frequencies of the pixels belonging to the edges in each of the horizontal and vertical directions to produce respective power spectra; and a peak-detecting section for detecting the spatial frequency at the peak in each of the power spectra, wherein the period-detecting section detects the periods of the edges based on the spatial frequencies at the peaks.

According to another aspect of the present invention, a method for processing an image includes an edge-extracting step of extracting edges of an input image composed of pixels in a matrix; a period-detecting step of detecting the periods of the edges; a dividing step of dividing the input image into blocks according to the periods of the edges; and a pixel-value converting step of converting the pixel values of all pixels in each of the blocks to a predetermined pixel value.

According to another aspect of the present invention, a recording medium contains a computer-readable program which includes an edge-extracting step of extracting edges of an input image composed of pixels in a matrix; a period-detecting step of detecting the periods of the edges; a dividing step of dividing the input image into blocks according to the periods of the edges; and a pixel-value converting step of converting the pixel values of all pixels in each of the blocks to a predetermined pixel value.

According to anther aspect of the present invention, a computer-readable program includes an edge-extracting step of extracting edges of an input image composed of pixels in a matrix; a period-detecting step of detecting the periods of the edges; a dividing step of dividing the input image into blocks according to the periods of the edges; and a pixel-value converting step of converting the pixel values of all pixels in each of the blocks to a predetermined pixel value.

According to the present invention, an input image can be converted to a low-resolution image that is still recognizable to the human visual sense.

BRIEF DESCRIPTION OF THE DRAWINGS

FIGS. 7A and 7B illustrate a Laplacian filter;

FIGS. 9A and 9B illustrate an edge detecting filter;

FIGS. 10A and 10B illustrate an edge detecting filter;

FIGS. 11A and 11B illustrate an edge detecting filter;

FIGS. 12A and 12B illustrate an edge detecting filter;

DESCRIPTION OF THE PREFERRED EMBODIMENTS

Figure 3:
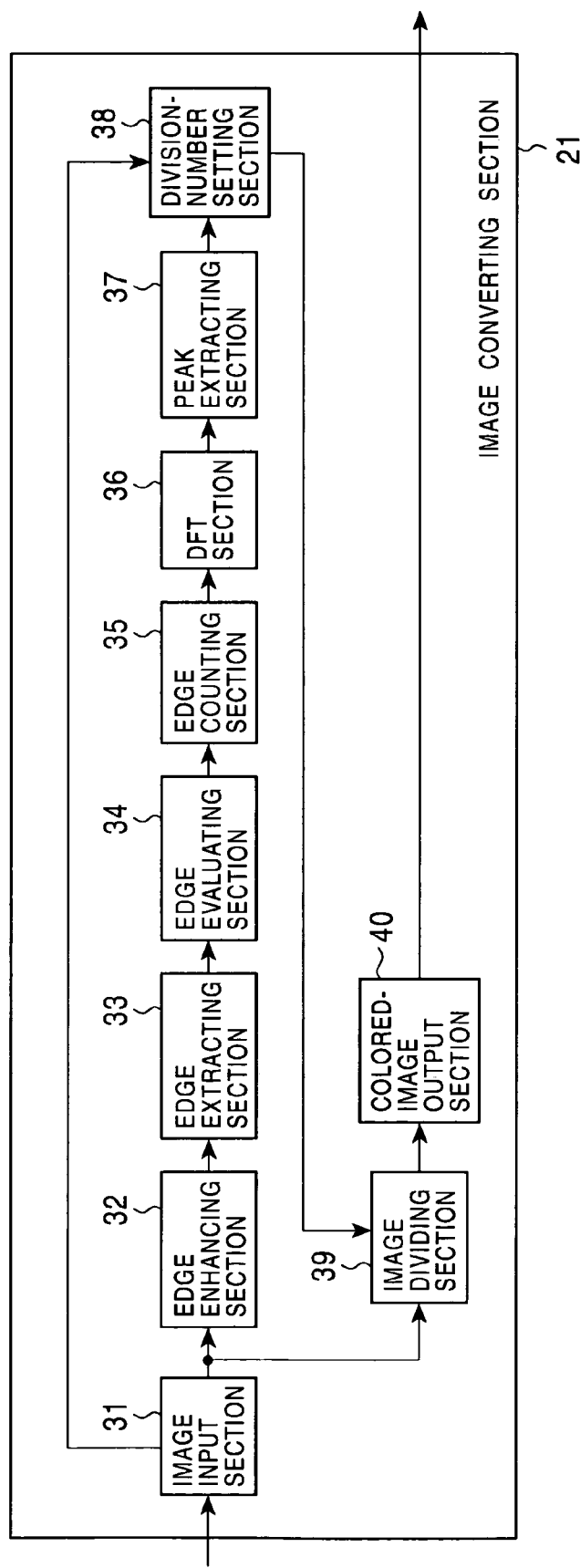
FIG. 3 is a block diagram showing the structure of an image converting section according to an embodiment of the present invention.

FIG. 3 is a block diagram showing the structure of an image converting section 21 according to an embodiment of the present invention.

The image converting section 21 converts an input image to a low-resolution image while still maintaining the low-resolution image recognizable. The image converting section 21 includes an image input section 31, an edge enhancing section 32, an edge extracting section 33, an edge evaluating section 34, an edge counting section 35, a discrete Fourier transform (DFT) section 36, a peak extracting section 37, a division-number setting section 38, an image dividing section 39, and a colored-image output section 40.

The image input section 31 acquires an input image, detects the image size (the number of pixels in the horizontal direction and the number of pixels in the vertical direction), and outputs the image size to the division-number setting section 38. Along with the processing described above, the image input section 31 analyses the input image into red, green, and blue (RGB) components, which are passed to the edge enhancing section 32. Furthermore, the image input section 31 outputs the acquired input image to the image dividing section 39.

The edge enhancing section 32 processes the input image with an edge enhancement filter to edge-enhance the input image, and outputs the resultant image to the edge extracting section 33. This edge enhancement filter is typically a Laplacian filter; however, any filter having an edge enhancement function is acceptable. The edge enhancement filter will be described later in detail.

The edge extracting section 33 applies edge extraction filtering to the edge-enhanced image received from the edge enhancing section 32, produces an edge-extracted image (e.g., a binary image consisting of edges with pixel values of 1 and the part other than the edges with pixel values of 0, as resulting from the edges being extracted from the edge-enhanced image), and outputs the resultant edge-extracted image to the edge evaluating section 34. The edge extracting filter is typically a Roberts edge detecting filter, a Prewitt edge detecting filter, or a Sobel edge detecting filter; however, any filter having an edge extracting function is acceptable. The edge extracting filter will be described later in detail.

The edge evaluating section 34 checks the edge-extracted image received from the edge extracting section 33 to determine whether each pixel in the edge-extracted image is likely to belong to an edge in the original input image. This is done by checking whether each pixel has a value of 1. Since the edges in the original input image should have a value of 1 after being converted to the edge-extracted image such as a binary image (where edges have a pixel value of 1 and the part other than the edges has a pixel value of 0), as a result of processing by the edge enhancing section 32 and the edge extracting section 33, the pixels in the edge-extracted image determined to have a value of 1 by the edge evaluating section 34 are also highly likely to belong to an edge in the original input image (such pixels are referred to hereinafter as edge pixels). The information concerning the edge pixels thus obtained is passed to the edge counting section 35.

The edge counting section 35 counts the number of edge pixels at each of the horizontal coordinate locations and the number of edge pixels at each of the vertical coordinate locations of the image, and then outputs the numbers of edge pixels to the DFT section 36.

The DFT section 36 applies a discrete Fourier transform to the numbers of edge pixels received from the edge counting section 35 in the horizontal direction and vertical direction, respectively, to produce a power spectrum of the spatial frequencies of the edges in each of the horizontal direction and the vertical direction. Here, the power spectrum corresponds to the sum of the squares of two elements (i.e., the coefficient of the real part and the coefficient of the imaginary part after the Fourier transform has been applied) constituting a Fourier series pair, and the spatial frequency corresponds to the reciprocal of the spatial period, i.e., the interval at which edges occur along the horizontal or vertical direction. The DFT section 36 then outputs the calculated power spectra to the peak extracting section 37.

Based on the power spectra received from the DFT section 36, the peak extracting section 37 detects the spatial frequency at the peak of the power spectrum in each of the horizontal direction and vertical direction, and outputs the information concerning the detected spatial frequencies at the peaks to the division-number setting section 38.

The division-number setting section 38 determines the numbers of divisions based on the image size input from the image input section 31 and the spatial frequencies at the peaks in the horizontal direction and vertical direction, and outputs the result to the image dividing section 39. In other words, the division-number setting section 38 divides the image into blocks corresponding to the edges occurring at intervals in the horizontal direction and vertical direction, where the edge occurrence intervals are the reciprocals of the spatial frequencies in the horizontal direction and vertical direction. More specifically, the division-number setting section 38 obtains edge occurrence intervals (numbers of pixels between edges), i.e., the reciprocals of the spatial frequencies in the horizontal direction and vertical direction. The division-number setting section 38 then divides the horizontal image dimension (the number of horizontal pixels of the image) by the number of horizontal pixels in the interval and also divides the vertical image dimension (the number of vertical pixels of the image) by the number of vertical pixels in the interval. In this manner, the number of horizontal divisions and the number of vertical divisions are calculated.

The image dividing section 39 divides the input image according to the numbers of horizontal and vertical divisions received from the division-number setting section 38, and outputs the divided image to the colored-image output section 40. In short, the image dividing section 39 divides the input image into as many blocks as determined by the received numbers of horizontal and vertical divisions.

The colored-image output section 40 selects a representative pixel value based on all pixels in each block of the mosaic image received from the image dividing section 39. The representative pixel value may be the median or mode (value of most frequent pixels). The colored-image output section 40 then assigns the representative pixel value to all pixels in the block, thus producing a mosaic image which is a low-resolution version of the input image.

Figure 4:
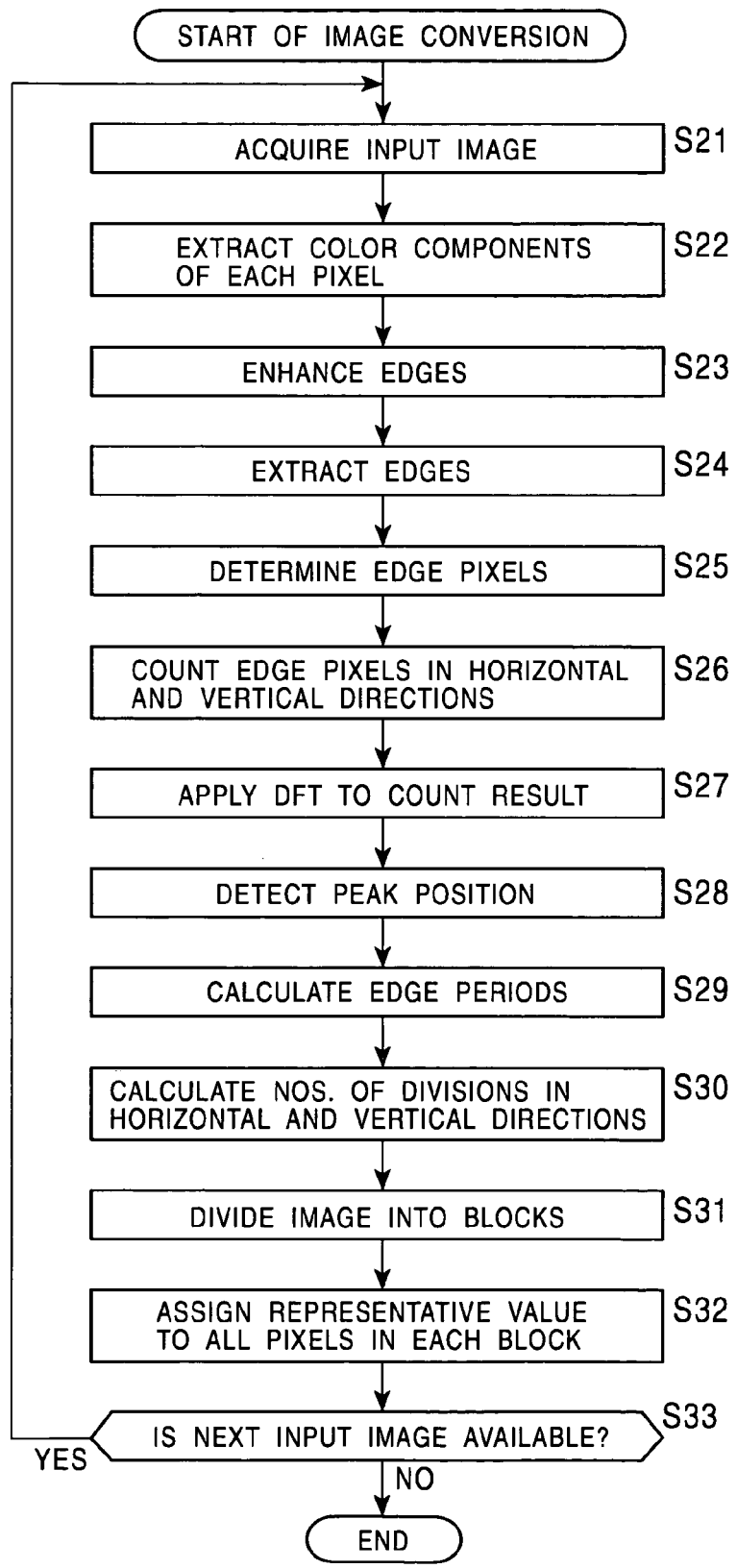
FIG. 4 is a flowchart describing image conversion by the image converting section in FIG. 3.

Image mosaicing by the image converting section 21 shown in FIG. 3 will now be described with reference to the flowchart shown in FIG. 4.

In step S21, the image input section 31 acquires an input image, detects the image size, and outputs the image size to the division-number setting section 38. Furthermore, the image input section 31 outputs the input image to the image dividing section 39.

In step S22, the image input section 31 analyses the value of each pixel in the input image into RGB components, which are passed to the edge enhancing section 32 as brightness values.

In step S23, the edge enhancing section 32 applies edge enhancement to the input image with the brightness values using the edge enhancement filter to enhance the edges of the input image, and outputs the edge-enhanced image to the edge extracting section 33.

The edge enhancement filter used for processing by the edge enhancing section 32 is described below.

Figure 5A:
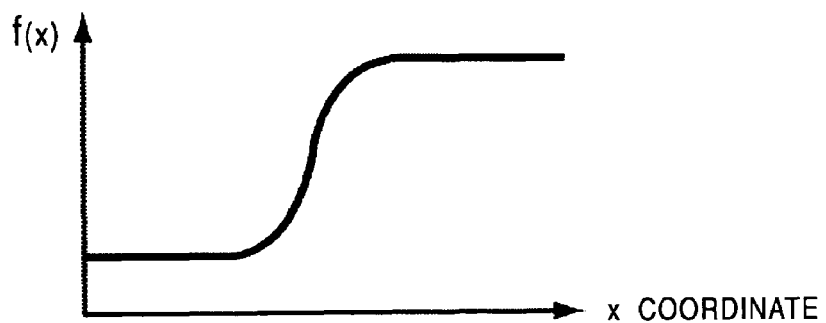
FIGS. 5A-D illustrate a Laplacian filter.
Figure 5B:
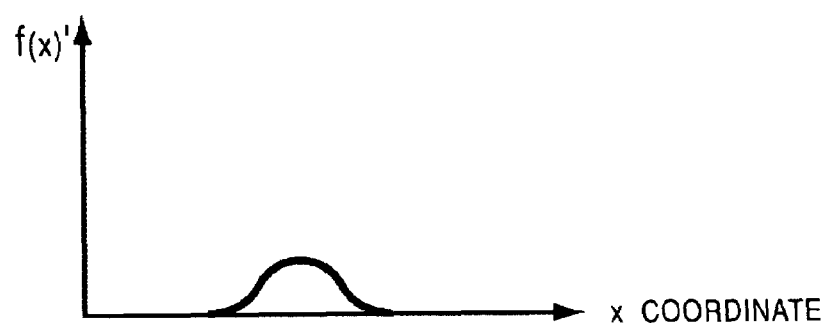
Figure 5C:
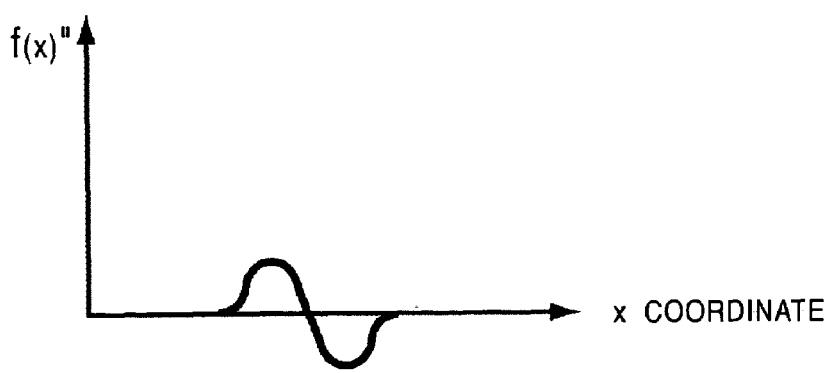
Figure 5D:
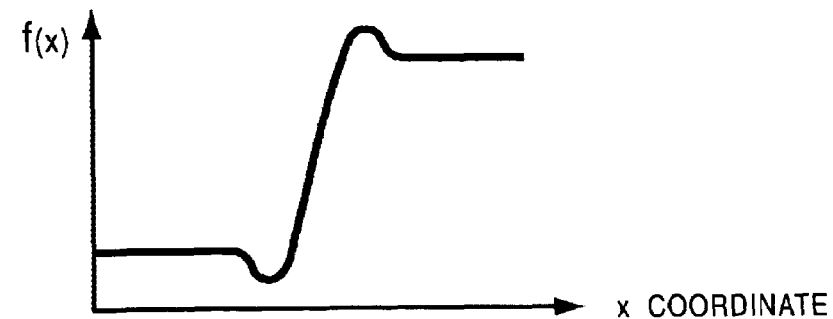

The edge enhancement filter is typically a Laplacian filter as described above. The Laplacian filter functions as follows. Referring to FIGS. 5A to 5D, applying a first derivative operation to a brightness function f(x) of an input image including an edge (as shown by the gradient in FIG. 5A) in the x direction (spatial direction) produces a convex-shaped first derivative function f(x)' as shown in FIG. 5B. A second derivative function f(x)'' is similar to a sine-wave curve, as shown in FIG. 5C. Subtracting the second derivative function f(x)'' from the original brightness function f(x) produces a waveform as shown in FIG. 5D. In more detail, the start and end of the edge of the original image are given changes in brightness value: a downward recess at the start and an upward swell at the end of the gradient, as shown in FIG. 5D. This means that the edge is enhanced.

The following description is about how pixel values are calculated for edge enhancement using a Laplacian filter.

Figure 6A:
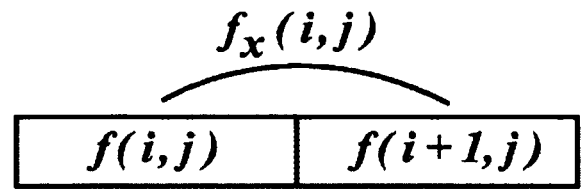
FIGS. 6A-D illustrate how a first derivative value and a second derivative value are calculated.
Figure 6B:
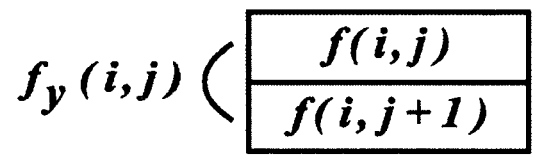

In digital image processing, the first derivative corresponds to a difference in brightness value between pixels. FIG. 6A shows the value f(i,j) of a pixel and the value f(i+1,j) of another contiguous pixel, the two pixels being arranged in the horizontal direction. FIG. 6B shows the value f(i,j) of a pixel and the value f(i,j+1) of another pixel, the two pixels being arranged in the vertical direction. In this situation, a first derivative $f_x(i,j)$ results from the difference between the pixel values f(i,j) and f(i+1,j) in the horizontal direction, whereas a first derivative $f_y(i,j)$ results from the difference between the pixel values f(i,j) and f(i,j+1) in the vertical direction. The first derivative $f_x(i,j)$ in the horizontal direction and the first derivative $f_y(i,j)$ in the vertical direction are calculated as shown by expressions (1) and (2), respectively.

$$f_x(i,j)=f(i+1,j)-f(i,j) \qquad (1)$$

$$f_y(i,j)=f(i,j+1)-f(i,j) \qquad (2)$$

Figure 6C:
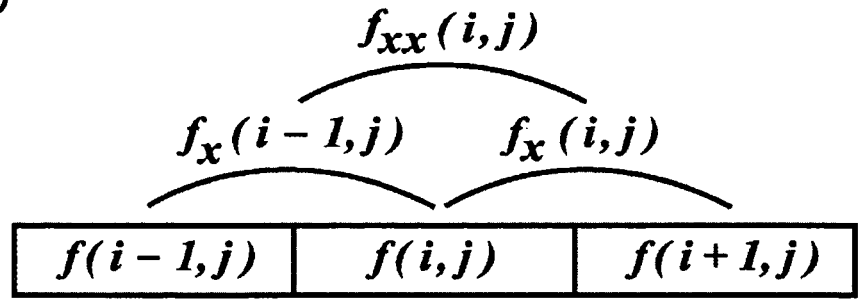
Figure 6D:
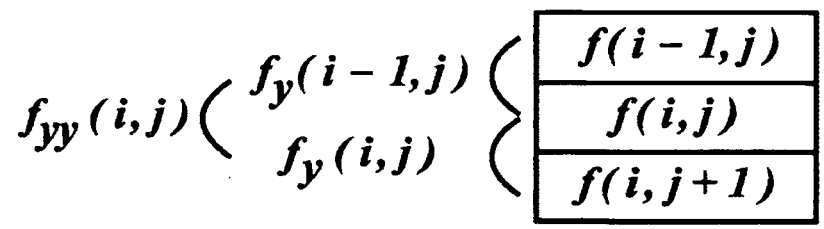

The second derivative corresponds to the difference between first derivatives. FIG. 6C shows pixel values f(i−1,j), f(i,j), and f(i+1,j) of pixels arranged in that order contiguously in the horizontal direction. FIG. 6D shows pixel values f(i,j−1), f(i,j), and f(i,j+1) of pixels arranged in that order contiguously in the vertical direction. In this situation, a second derivative $f_{xx}$ between the pixels arranged in the horizontal direction is obtained by expression (3), whereas a second derivative $f_{yy}$ between pixels arranged in the vertical direction is obtained by expression (4).

$$f_{xx}(i,j) = f_x(i,j) - f_x(i+1,j) \quad (3)$$
$$= \{f(i+1,j) - f(i,j)\} - \{f(i,j) - f(i-1,j)\}$$
$$= f(i+1,j) - 2 \times f(i,j) + f(i-1,j)$$

$$f_{yy}(i,j) = f_y(i,j+1) - f_y(i,j) \quad (4)$$
$$= \{f(i,j+1) - f(i,j)\} - \{f(i,j) - f(i,j-1)\}$$
$$= f(i,j+1) - 2 \times f(i,j) + f(i,j-1)$$

From the relationships shown above, a Laplacian $\nabla^2 f(i,j)$ is defined by expression (5) below.

$$\nabla^2 f(i,j) = f_{xx}(i,j) + f_{yy}(i,j) \quad (5)$$
$$= f(i+1,j) - 2 \times f(i,j) + f(i-1,j) +$$
$$f(i,j+1) - 2 \times f(i,j) + f(i,j-1)$$
$$= f(i+1,j) + f(i-1,j) + f(i,j+1) +$$
$$f(i,j-1) - 4 \times f(i,j)$$

Subtracting the Laplacian $\nabla^2 f(i,j)$ from an original-image pixel value $f(i,j)$ derives a pixel value $g(i,j)$ of an edge-enhanced image according to expression (6).

$$g(i,j) = f(i,j) - \nabla^2 f(i,j) \quad (6)$$
$$= f(i,j) - (f(i+1,j) + f(i-1,j) + f(i,j+1) +$$
$$f(i,j-1) - 4 \times f(i,j))$$
$$= -f(i+1,j) - f(i-1,j) - f(i,j+1) -$$
$$f(i,j-1) + 5 \times f(i,j))$$

Figures 7A, 7B:
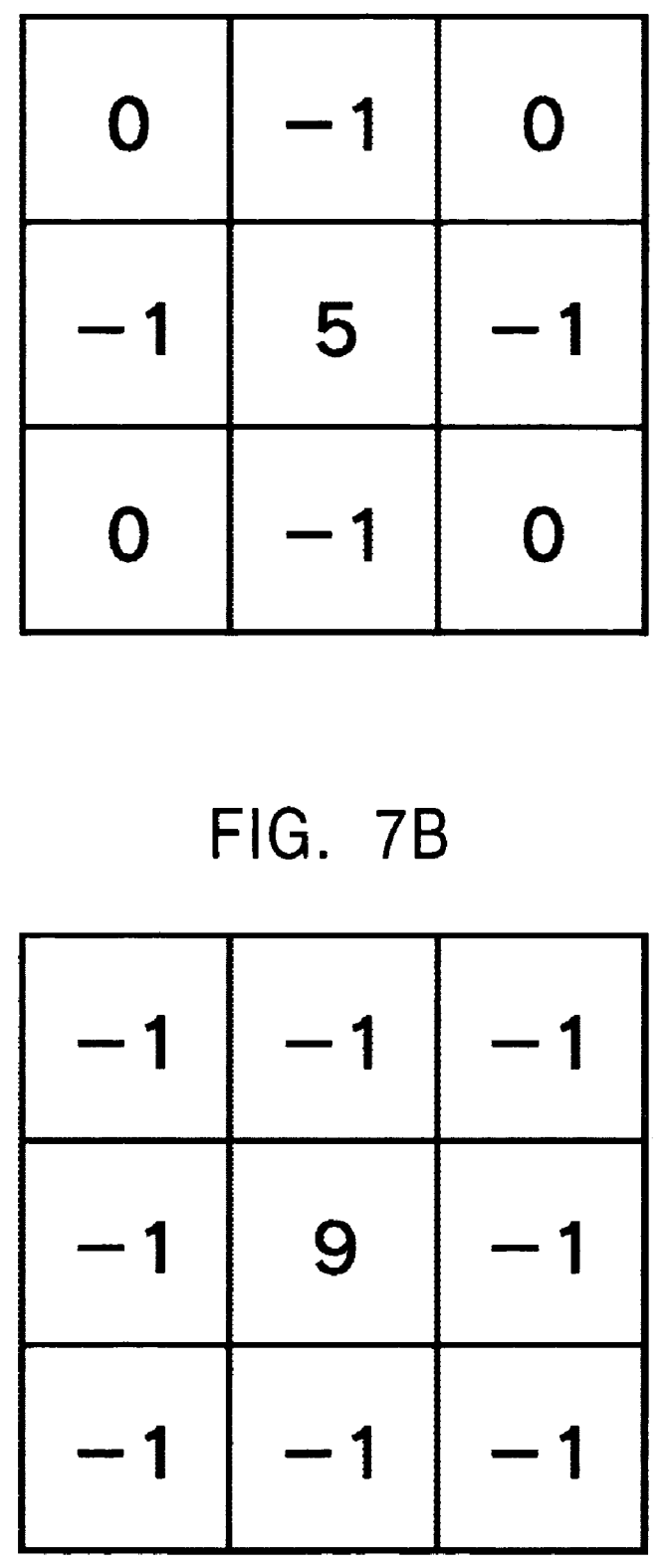

Expression (6) is implemented in the form of a filter shown in FIG. 7A, which has a pixel of interest at the center and the neighboring four pixels (one each above, below, left, and right) each having a coefficient for the second derivative. The filter in FIG. 7A is a 3-pixel by 3-pixel filter (Laplacian filter) consisting of coefficients 0, −1, 0, −1, 5, −1, 0, −1, and 0 arranged from left to right and from top to bottom; the pixels in diagonal directions to the pixel of interest have a value of 0. This means that this filter effectively functions in the horizontal and vertical directions only; that is, this filter has an effect on the pixel of interest at the center and the neighboring four (left, right, upper, and lower) pixels.

If the filter is to have an effect on the diagonal pixels with respect to the center pixel, the filter may be a 3-pixel by 3-pixel (9-pixel) filter consisting of coefficients −1, −1, −1, −1, 9, −1, −1, −1, and −1 arranged from left to right and from top to bottom, as shown in FIG. 7B.

It is noted that the edge enhancing section 32 may adopt a tool other than a Laplacian filter for edge enhancement. It may employ any tool that allows the input image to be edge-enhanced; for example, the input image may be subjected to a fast Fourier transform (FFT), the high-frequency components may be enhanced in the spatial frequency domain, and the resultant function may be subjected to an inversed FFT back to the spatial domain.

Referring back to FIG. 4, in step S24, the edge extracting section 33 produces an edge-extracted image (image consisting of edges) using the edge extracting filter based on the edge-enhanced image received from the edge enhancing section 32, and then outputs the resultant edge-extracted image to the edge evaluating section 34. More specifically, the edge extracting section 33 may produce a binary image as the edge-extracted image, where the edges have a pixel value of 1 and the part other than the edges have a pixel value of 0.

A description of the edge extracting filter follows.

As described above, edges in an image have a large difference of pixel values (brightness values in this embodiment) between contiguous pixels. Based on this fact, the edge extracting section 33 compares the value defined by expression (7) below based on a differential pixel value (i.e., the difference of pixel values between contiguous pixels) with a predetermined threshold. In this manner, the edge extracting section 33 determines that pixels having a differential value above the threshold belong to an edge.

$$|\nabla f(i,j)| = \sqrt{(f_x^2(i,j) + f_y^2(i,j))} \quad (7)$$

Figure 8A:
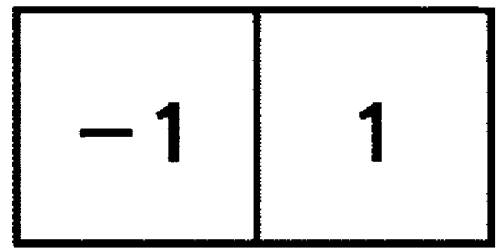
FIGS. 8A and 8B illustrate an edge detecting filter.
Figure 8B:
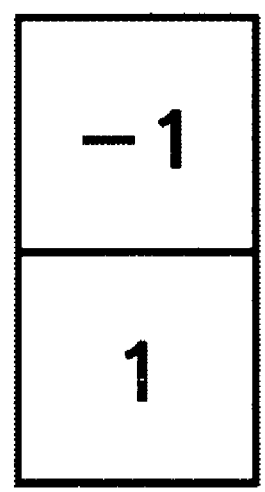

In expression (7), the first derivatives $f_x(i,j)$ and $f_y(i,j)$ are as defined by expressions (1) and (2), respectively. In more detail, the first derivative value $f_x(i,j)$ in the horizontal direction can be obtained by multiplying the pixel values (brightness values) of two contiguous pixels, as shown in FIG. 8A, by the respective coefficients (i.e., −1 and 1 from left to right), and then summing the results. Similarly, the first derivative value $f_y(i,j)$ in the vertical direction can be obtained by multiplying the pixel values (brightness values) of two contiguous pixels, as shown in FIG. 8B, by the respective coefficients (i.e., −1 and 1 from top to bottom), and then summing the results. The pixel of interest in the horizontal direction may be either the left or right pixel in FIG. 8A, and the pixel of interest in the vertical direction may be either the upper or lower pixel in FIG. 8B.

Arithmetic operations based on expression (7) take a long time if applied to all pixels of the relevant image. For more efficient processing, expression (8) or (9) shown below may be used as an approximated alternative.

$$|\nabla f(i,j)| \approx |f_x(i,j)| + |f_y(i,j)| \quad (8)$$

$$|\nabla f(i,j)| \approx \text{Max}(|f_x(i,j)|, |f_y(i,j)|) \quad (9)$$

where Max (A,B) indicates the larger of A and B.

Figure 1:
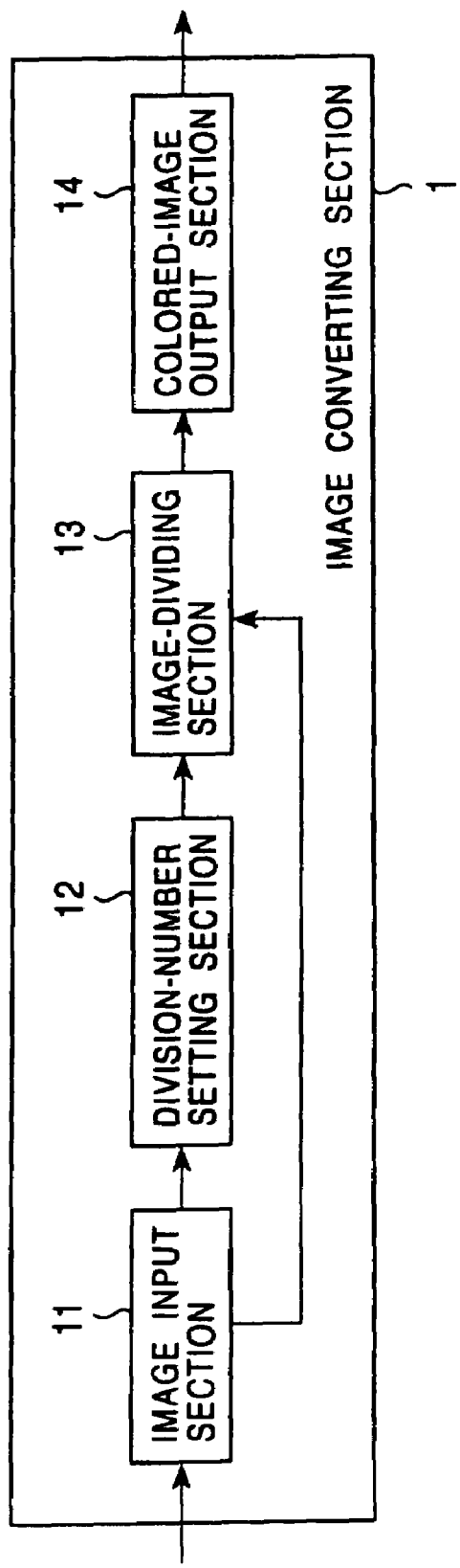
FIG. 1 is a block diagram showing the structure of a known image converting section.
Figure 2:
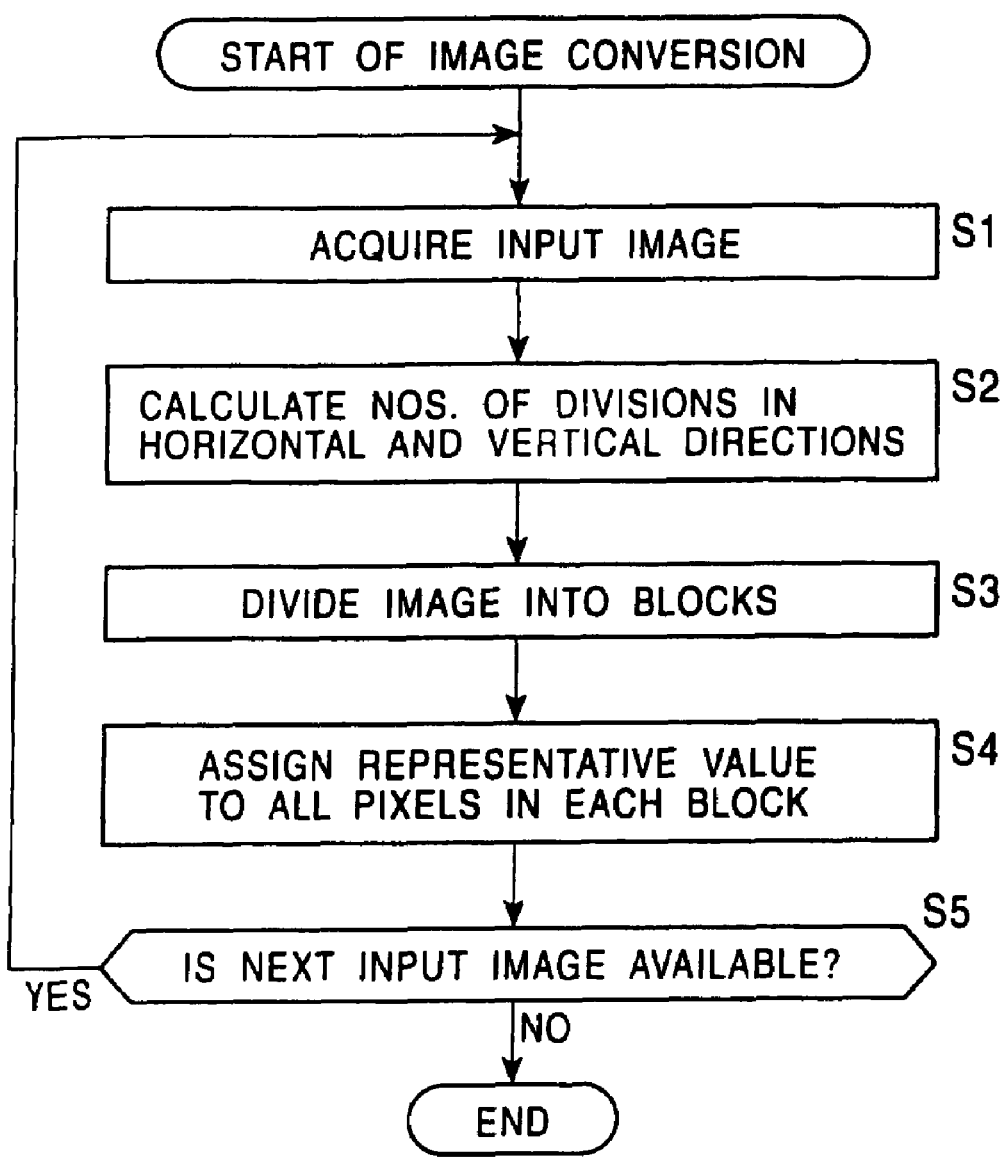
FIG. 2 is a flowchart describing image conversion by the image converting section in FIG. 1.
Figures 9A, 9B:
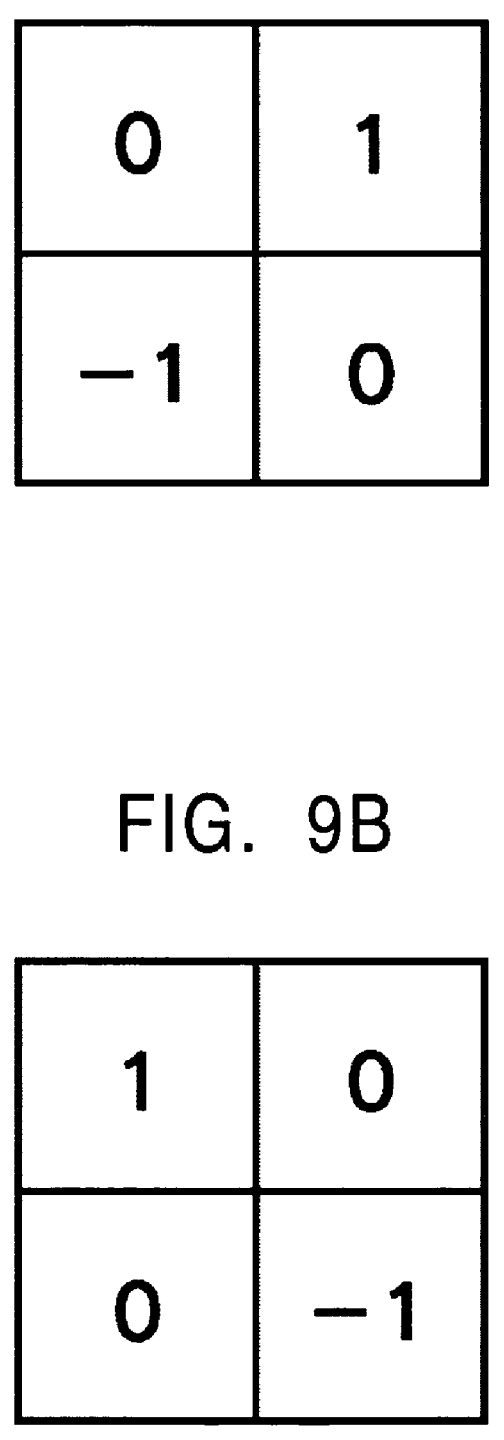

The edge extracting technique described above is based on the pixel to the left or right of the pixel of interest being selected in the horizontal direction or the pixel above or below the pixel of interest being selected in the vertical direction. It is also acceptable to select, as the neighboring pixel, a diagonal pixel with respect to the pixel of interest, as shown in FIGS. 9A and 9B, for edge extraction to obtain the difference of pixel values between the pixel of interest and the selected neighboring pixel. In FIG. 9A, the pixel of interest is either the lower-left pixel or the upper-right pixel. In FIG. 9B, the pixel of interest is either the upper-left pixel or the lower-right pixel. Values 0, 1, −1, and 0 from left to right and from top to bottom in FIG. 9A and 1, 0, 0, and −1 from left to right and from top to bottom in FIG. 9B are the coefficients which are to be multiplied by the values of the respective pixels.

An edge extracting filter based on the difference of pixel values from the diagonal pixel with respect to the pixel of interest is called a Roberts edge detecting filter (referred to hereinafter just as a Roberts filter).

Instead of expression (7), the Roberts filter uses expression (10) below.

$$|\nabla f(i,j)| = \sqrt{((f(i,j) - f(i+1,j+1))^2 + (f(i+1,j) - f(i,j+1))^2)} \quad (10)$$

Thus, a Roberts filter detects edges based on expression (10). As with expression (7), expression (10) may be replaced with a simplified alternative expression (11) or (12) for efficient processing.

$$|\nabla f(i,j)| \approx |f(i,j)-f(i+1,j+1)|+|f(i+1,j)-f(i,j+1)| \quad (11)$$

$$|\nabla f(i,j)| \approx \text{Max}\left(|(f(i,j)-f(i+1,j+1)|,|f(1+1,j)-f(i,j+1)|\right) \quad (12)$$

Figures 10A, 10B:
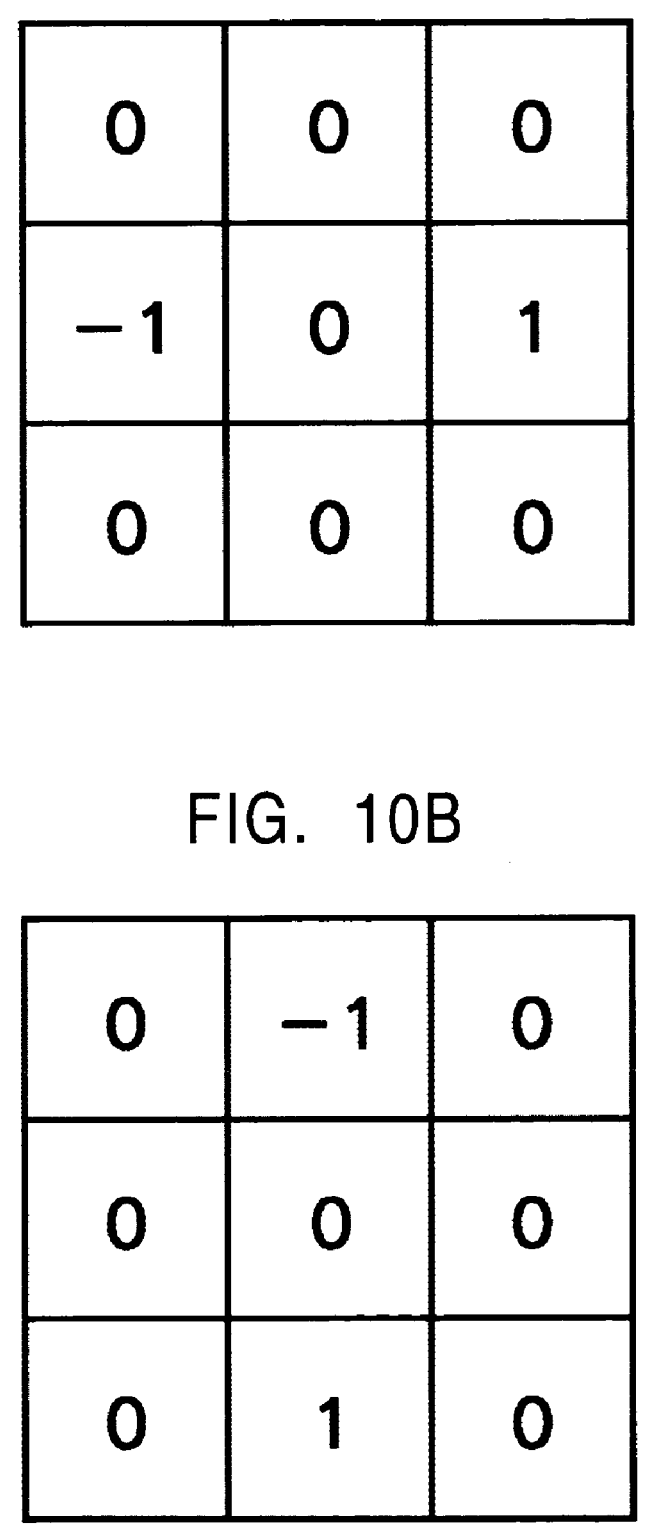

Typical edge extracting techniques have been described. Strictly speaking, however, a first derivative $f_x(i,j)$ in expression (1) is not exactly associated with the pixel of interest at the (i,j) coordinate location but at the (i+0.5,j) coordinate location. To avoid this inaccuracy, the two pixels to the left and right of a pixel of interest at the center of FIG. 10A and the two pixels above and below a pixel of interest at the center of FIG. 10B are processed so that the difference between the values of the two pixels in the horizontal direction, as shown in FIG. 10A, and the difference between the values of the two pixels in the vertical direction, as shown in FIG. 10B, are calculated to obtain the horizontal and vertical first derivative values with respect to the pixels of interest. In other words, the 3-pixel by 3-pixel (nine pixels in total) filter in FIG. 10A essentially relies on the two pixels to the left and right of the pixel of interest, thus calculating the first derivative value with respect to the pixel of interest (i.e., the difference between the values of the two pixels neighboring the pixel of interest) in the horizontal direction. Similarly, the 3-pixel by 3-pixel (nine pixels in total) filter in FIG. 10B essentially relies on the two pixels above and below the pixel of interest, thus calculating the first derivative value with respect to the pixel of interest (i.e., the difference between the values of the two pixels neighboring the pixel of interest) in the vertical direction. This filtering technique uses two pixels not neighboring each other (i.e., the two pixels are separated by a longer distance) and is advantageously more resistant to noise.

Figures 11A, 11B:
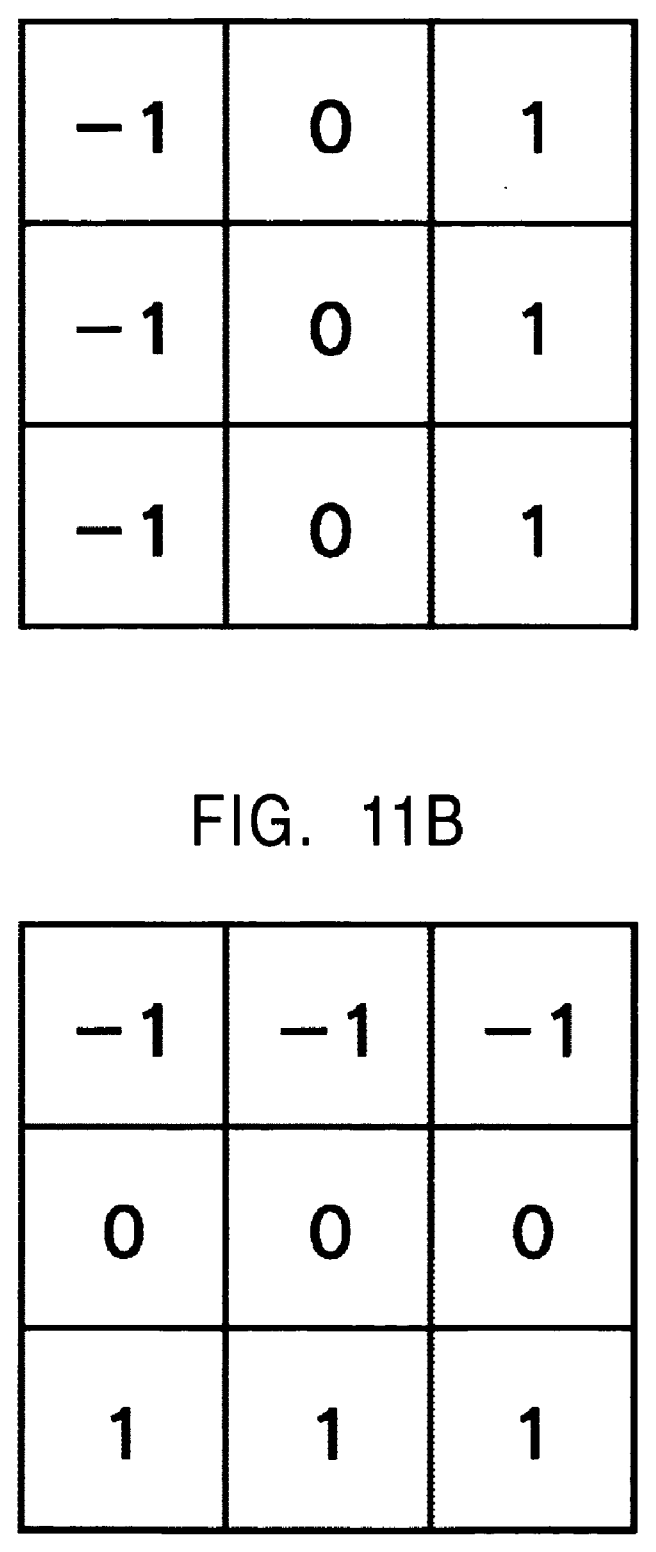

As shown in FIG. 11A, it is also acceptable to calculate the difference between the sum of the values of the pixels to the upper left, left, and lower left of the pixel of interest and the sum of the values of the pixels to the upper right, right, and lower right of the pixel of interest. This operation produces first derivative values for smoothing in the horizontal direction. The pixel values of the pixels in FIG. 11A are multiplied by the respective coefficients (i.e., −1, 0, 1, −1, 0, 1, −1, 0, and 1 from left to right and from top to bottom) and then the respective results are summed.

Similarly, as shown in FIG. 11B, it is also acceptable to calculate the difference between the sum of the values of the pixels to the upper left, above, and to the upper right of the pixel of interest and the sum of the values of the pixels to the lower right, below, and to the lower left of the pixel of interest. This operation produces first derivative values for smoothing in the vertical direction. The pixel values of the pixels in FIG. 11B are multiplied by the respective coefficients (i.e., −1, −1, −1, 0, 0, 0, 1, 1, and 1 from left to right and from top to bottom) and then the respective results are summed. In general, the filters shown in FIGS. 11A and 11B are called Prewitt edge detecting filters (referred to hereinafter just as Prewitt filters).

Figures 12A, 12B:
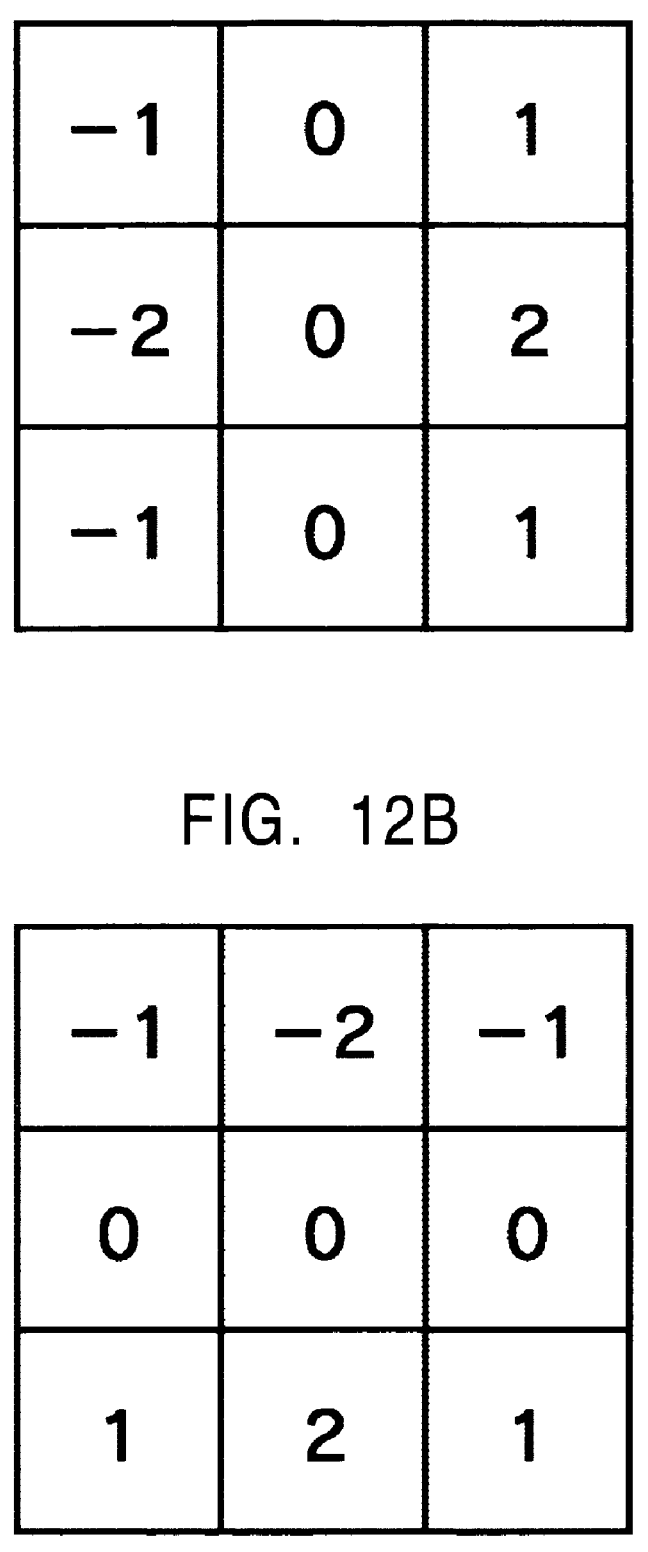

Referring now to FIG. 12A, the coefficients of the filter may be set such that only the pixels horizontally neighboring the pixel of interest are weighted. In the example of FIG. 12A, the pixel values of the pixels are multiplied by the respective coefficients (i.e., −1, 0, 1, −2, 0, 2, −1, 0, and 1 from left to right and from top to bottom) and then the respective results are summed.

Similarly, as shown in FIG. 12B, the coefficients of the filter may be set such that only the pixels vertically neighboring the pixel of interest are weighted. In the example of FIG. 12B, the pixel values of the pixels are multiplied by the respective coefficients (i.e., −1, −2, −1, 0, 0, 0, 1, 2, and 1 from left to right and from top to bottom) and then are summed.

Filtering as shown in FIGS. 12A and 12B allows the values of the closest neighboring pixels to be weighted highly for more accurate edge detection. In general, the filters shown in FIGS. 12A and 12B are called Sobel edge detecting filters (referred to hereinafter just as Sobel filters).

Figure 13:
FIG. 13 shows an example of an input image.
Figure 14:
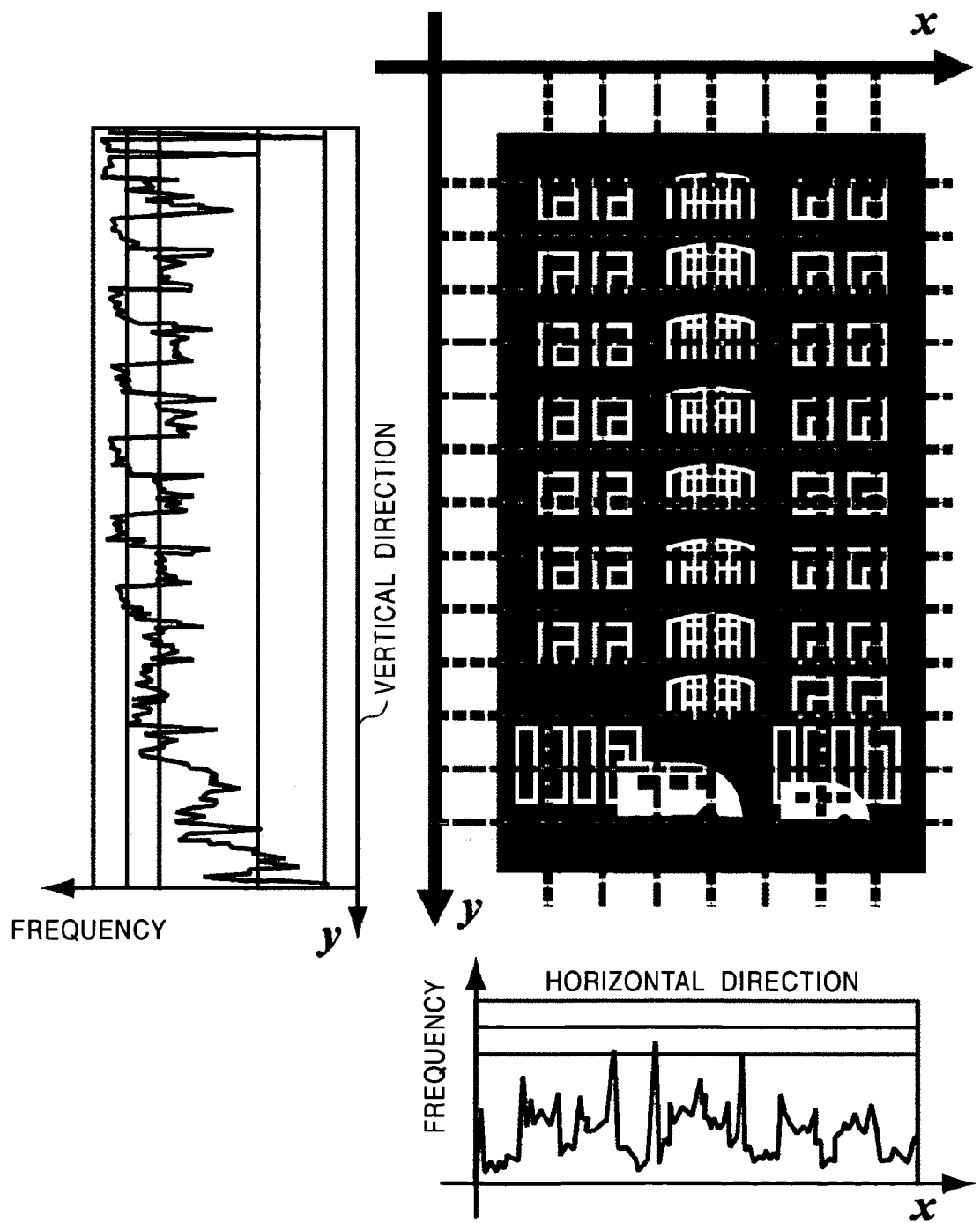
FIG. 14 shows an example of processing the input image in FIG. 13 using an edge extracting filter.

Filtering with one of the edge detecting filters described above converts an input image such as the building image shown in FIG. 13 to a mosaic image such as the one shown in the right area in FIG. 14, where only the edges (portions with changes in pixel values) appear white and the part other than the edges appears black. Thus, the image in FIG. 14 is an edge-extracted image.

Referring back to FIG. 4, in step S25, the edge evaluating section 34 checks the edge-extracted image to evaluate whether each pixel is an edge pixel in the original input image. The result of evaluation for each pixel is output to the edge counting section 35. More specifically, if the edge-extracted image is the binary image described above (i.e., an image consisting of edges with a pixel value of 1 and the part other than the edges with a pixel value of 0), the edge evaluating section 34 evaluates whether each pixel of the input image has a pixel value of 1, and outputs the results of evaluation to the edge counting section 35.

In step S26, based on the results of evaluation received from the edge evaluating section 34, the edge counting section 35 counts the edge pixels at each of the coordinate locations in the horizontal direction and vertical direction of the image. The results of counting are output to the DFT section 36. For example, in the edge-extracted image shown in FIG. 14 where the x direction is rightward in the horizontal direction and the y direction is downward in the vertical direction, edge pixels (white pixels with a value of 1 in the image) are counted at each of the coordinate locations in the x direction, as shown by the lower right graph in FIG. 14, and then the results of counting are output to the DFT section 36.

As shown by the lower right graph in FIG. 14 illustrating the number of edges in the x direction, more edge pixels are counted where edges (typically window frames appearing white in the image) exist, whereas less edge pixels are counted where objects other than edges (typically the building wall appearing black) exist. Similarly, as shown by the left graph in FIG. 14 illustrating the number of edges in the y direction, more edge pixels are counted where edges (typically window frames appearing white in the image) exist, whereas less edge pixels are counted where objects other than edges (typically the building wall appearing black) exist.

Thus, the two graphs in FIG. 14 represent the edge pixel count (i.e., frequency) at each of the coordinate locations in the horizontal and vertical directions.

In step S27, the DFT section 36 applies a discrete Fourier transform (DFT) to the relationships represented by the two graphs in FIG. 14 received from the edge counting section 35, and outputs the results of the DFT to the peak extracting section 37.

Figure 15:
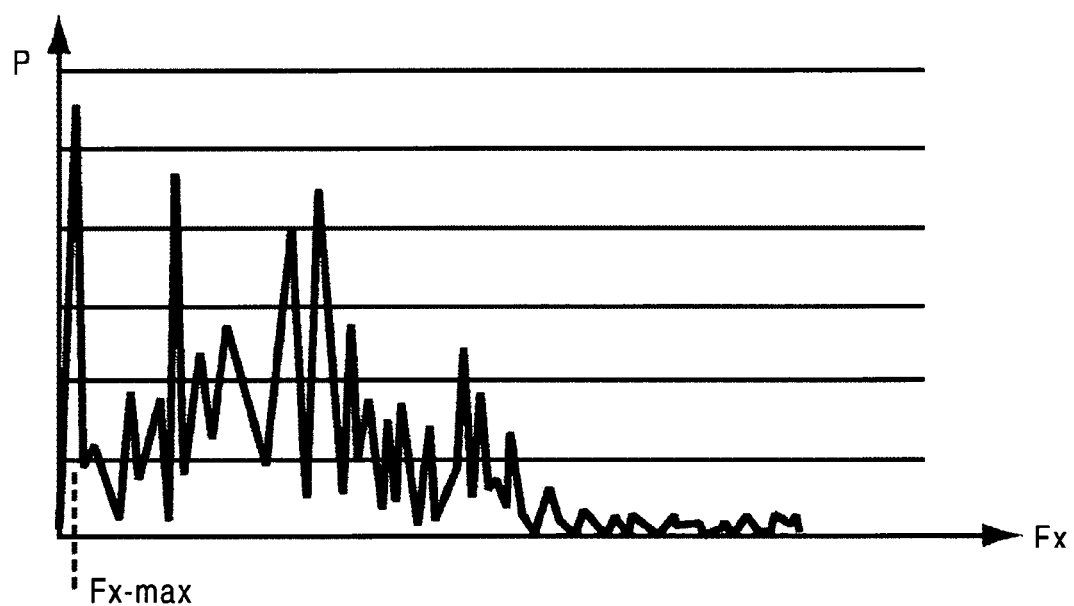
FIG. 15 shows a power spectrum in the horizontal direction.

Applying a DFT to the lower right graph in FIG. 14, i.e., the relationships between edge pixel count and the horizontal direction, produces the relationship between the spatial frequency in the x direction and the Fourier coefficient as shown in FIG. 15. In short, the horizontal axis Fx in FIG. 15 is the spatial frequency in the x direction. The vertical axis P in FIG. 15 represents the sum of the squares of two elements (i.e., the coefficient of the real part and the coefficient of the imaginary part) constituting the Fourier series pair for each spatial frequency after a Fourier transform has been applied. The relationship shown in FIG. 15 is typically referred to as a power spectrum. Thus, the DFT section 36 converts the relationship between edge pixel count along the horizontal direction (x direction), as shown in the lower right graph in FIG. 14, to a power spectrum in the x direction.

Figure 16:
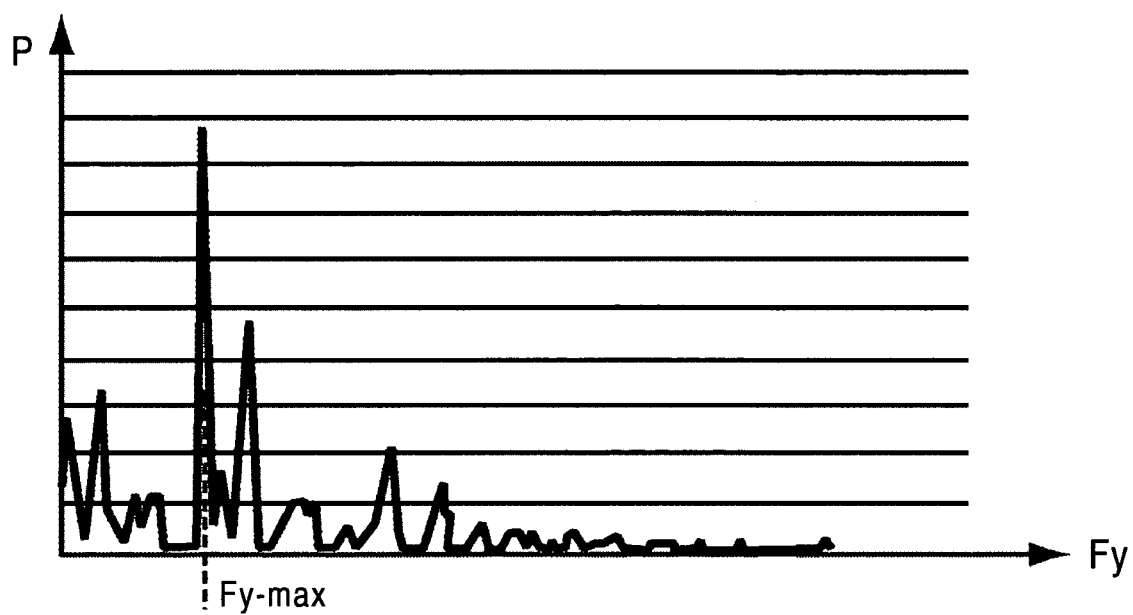
FIG. 16 shows a power spectrum in the vertical direction.

Similarly, applying a DFT to the left graph in FIG. 14, i.e., the relationship between edge pixel count and the vertical direction, produces the relationship between the spatial frequency in the y direction and the Fourier coefficient as shown in FIG. 16. In short, the horizontal axis Fy in FIG. 16 is the spatial frequency in the y direction. The vertical axis P in FIG. 16 represents the sum of the squares of two elements (i.e., the coefficient of the real part and the coefficient of the imaginary part) constituting the Fourier series pair for each spatial frequency after a Fourier transform has been applied. Thus, the DFT section 36 converts the relationship between edge pixel count along the vertical direction (y direction), as shown in the left graph in FIG. 14, to a power spectrum in the y direction.

In step S28, the peak extracting section 37, based on the power spectra received from the DFT section 36, extracts the spatial frequency corresponding to the peak of the power spectrum in the x direction and the spatial frequency corresponding to the peak of the power spectrum in the y direction. The peak extracting section 37 then outputs the extracted two spatial frequencies to the division-number setting section 38.

When the power spectra in the x direction and y direction shown in FIGS. 15 and 16 are detected, the peak extracting section 37 extracts the spatial frequency Fx-max which is the spatial frequency corresponding to the peak of the power spectrum in the x direction, as shown in FIG. 15, and the spatial frequency Fy-max which is the spatial frequency corresponding to the peak of the power spectrum in the y direction, as shown in FIG. 16. The extracted two spatial frequencies Fx-max and Fy-max are then output to the division-number setting section 38.

In step S29, the division-number setting section 38 calculates the intervals at which edges occur in the x direction and y direction based on the spatial frequencies Fx-max and Fy-max received from the peak extracting section 37. Since a spatial frequency represents how many edges occur within a unit length in the x direction or y direction, the edge occurrence period (interval) is the reciprocal of the spatial frequency. In other words, the edge occurrence interval is the distance (in units of pixels) between edges in the x direction or y direction. The division-number setting section 38 thus calculates the reciprocal of the spatial frequency Fx-max in the x direction (corresponding to the maximum of the power spectrum in the x direction) and the reciprocal of the spatial frequency Fy-max in the y direction (corresponding to the maximum of the power spectrum in the y direction), thus producing the edge occurrence interval as the number of pixels between edges in the x direction (1/Fx-max) and the edge occurrence interval as the number of pixels between edges in the y direction (1/Fy-max).

In step S30, the division-number setting section 38 determines the number of divisions Dx in the x direction (horizontal) and the number of divisions Dy in the y direction (vertical) of the input image based on the edge occurrence intervals, and outputs the information concerning Dx and Dy to the image dividing section 39. In short, the division-number setting section 38 divides the image size of the input image received from the image input section 31 by the edge occurrence intervals; that is, the number of pixels in the x direction of the image is divided by the edge occurrence interval in the x direction (1/Fx-max) and the number of pixels in the y direction of the image is divided by the edge occurrence interval in the y direction (1/Fy-max) to produce the number of divisions Dx in the x direction and the number of divisions Dy in the y direction of the input image.

Figure 17:
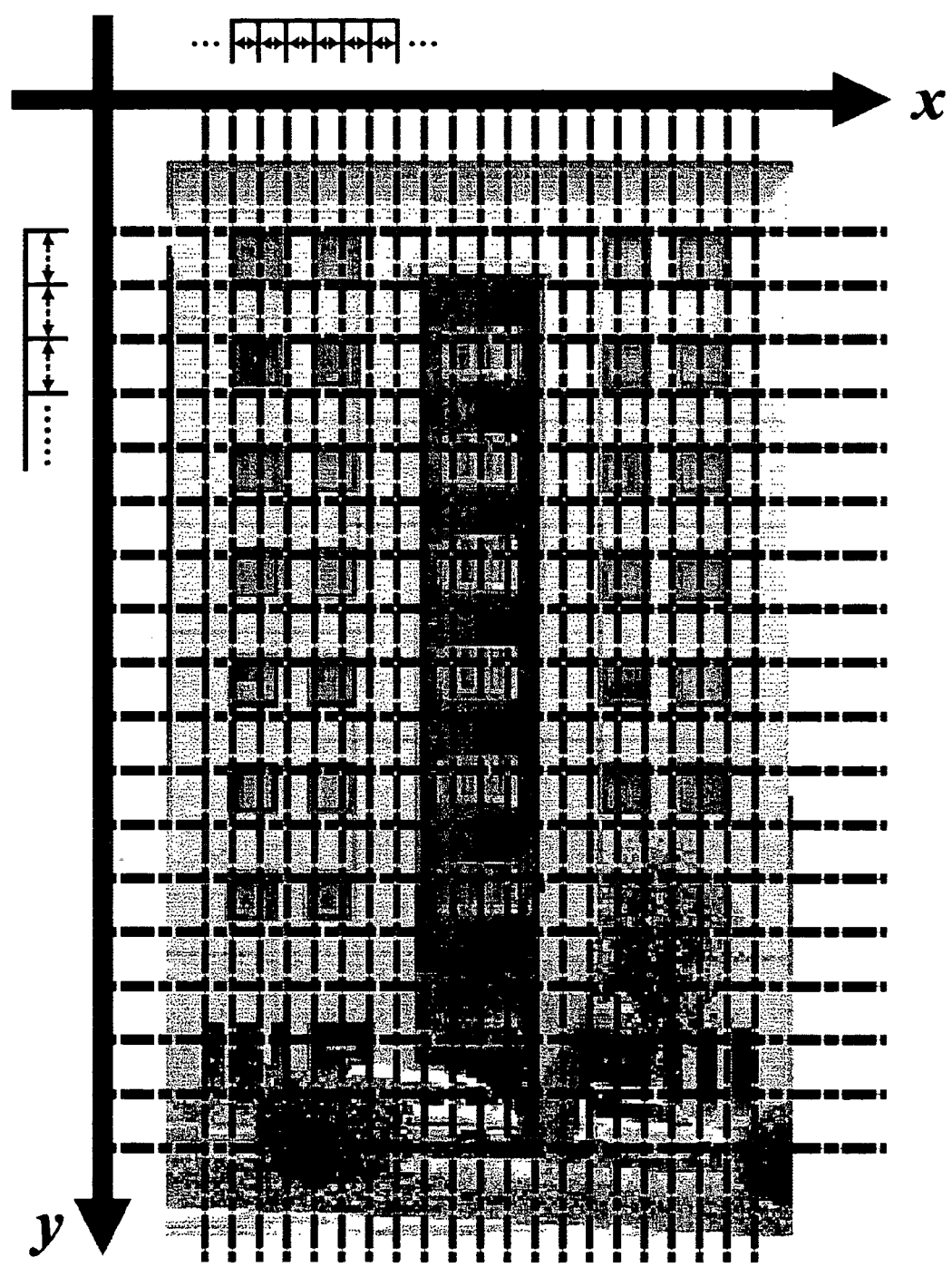
FIG. 17 is an example of an image produced as a result of the input image in FIG. 13 being divided.

In step S31, the image dividing section 39 divides the input image received from the image input section 31 into blocks based on the Dx and Dy received from the division-number setting section 38, and outputs the image formed of blocks to the colored-image output section 40. In more detail, the image dividing section 39 divides the input image shown in FIG. 13 into blocks at the interval 1/Fx-max (as indicated by the solid lines with arrows above the x axis in FIG. 17) in the x direction and at the interval 1/Fy-max (as indicated by the solid lines with arrows to the left of the y axis in FIG. 17) in the y direction, and outputs the image formed of blocks to the colored-image output section 40. In short, the image dividing section 39 divides the input image into as many blocks as determined by Dx×Dy, each block having a size of 1/Fx-max in the x direction×1/Fy-max in the y direction.

Figure 18:
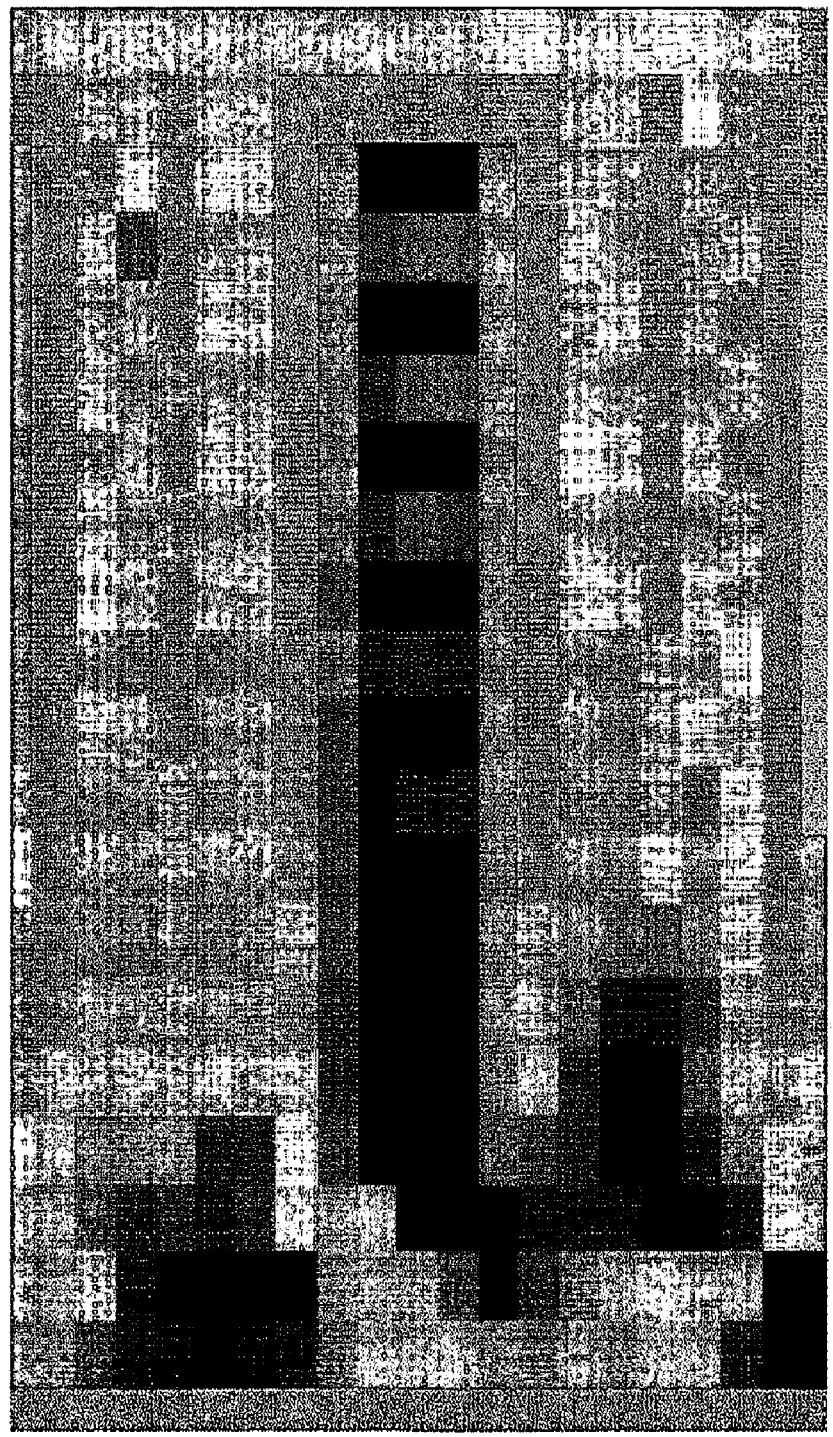
FIG. 18 is an example of an image produced as a result of the input image in FIG. 13 being converted to a low-resolution image.

In step S32, the colored-image output section 40 calculates the average of all pixels included in each of the blocks in the image received from the image dividing section 39, and assigns the result as the representative pixel value to all pixels in the block. As a result, the colored-image output section 40 converts the input image shown in FIG. 13 to the mosaic image shown in FIG. 18 as an output image. Thus, the input image shown in FIG. 13 is converted to a low-resolution mosaic image composed of Dx×Dy blocks.

In step S33, the image input section 31 checks if the next input image is available. If it is determined that the next input image is available, the flow control returns to step S21 and the subsequent processing is repeated. Steps S21 to S33 are repeated until no next input image is available; that is, if it is determined that no next input image is available in step S33, the processing flow ends.

As described above, the image converting section 21 in FIG. 3 can determine the numbers of divisions of the input image in the horizontal direction and vertical direction based on the edge intervals of the input image. This approach advantageously allows the sizes of the blocks of a mosaic image to be dynamically determined such that the mosaic image still preserves the information necessary for recognition by human beings. In this manner, the input image is converted to a low-resolution image composed of blocks having the sizes thus determined. As a result, the produced mosaic image has low resolution but is still recognizable to the human visual sense.

Therefore, images which do not have to preserve high resolution, such as images which do not have to be displayed or saved as high-resolution images, can be converted to recognizable low-resolution images using the techniques described above. This advantageously makes it possible to carry out various types of processing (transfer, display, saving, etc.) of the images under a decreased load, while still maintaining images recognizable to human beings.

In the above embodiment, the colored-image output section 40 selected the average of all pixel values in each block as a representative pixel value in step S32. The representative pixel value may be determined differently: mode or median in each block, average between the maximum and minimum values in each block, pixel value of the pixel at the center of gravity in each block, etc.

In the above described embodiment, the edge enhancing section 32 enhances the edges of the input image (step S23); the edge extracting section 33 extracts the edges of the input image (step S24); the edge counting section 35 counts the edge pixels detected by the edge evaluating section 34 along the horizontal direction and vertical direction (step S26); the DFT section 36 applies a discrete Fourier transform to the numbers of edge pixels to produce power spectra (step S27); the peak extracting section 37 extracts the spatial frequencies at the peaks of the power spectra (step S28); the division-number setting section 38 detects the edge intervals of the input image based on the extracted spatial frequencies (step S29) and determines the numbers of divisions of the input image based on the detected edge intervals (step S30); the image dividing section 39 divides the input image into the determined number of blocks (step S31); and the colored-image output section 40 assigns a particular pixel value (average of all pixels in each block) to all pixels in the block. Consequently, the input image can be converted to a low-resolution image that is still recognizable to the human visual sense.

The sequence of processing described above can be implemented using not only hardware but also software. If the sequence of processing is to be implemented using software, the software is installed from a recording medium to, for example, a computer built into dedicated hardware or a general-purpose personal computer that requires a program to be installed to carry out the corresponding functions.

Figure 19:
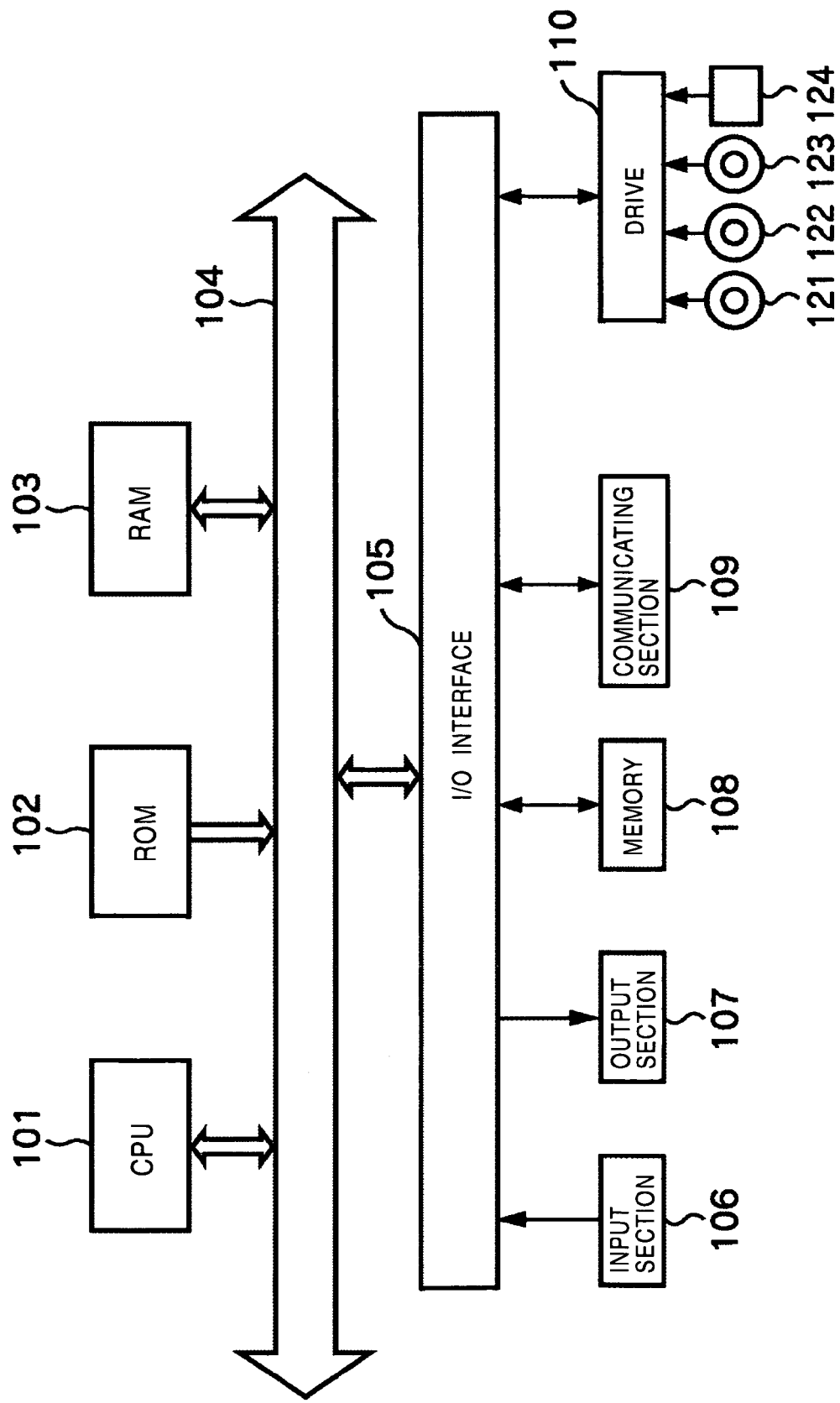
FIG. 19 illustrates a recording medium.

FIG. 19 shows the structure of a personal computer according to another embodiment of the present invention, where the function of the image converting section 21 in FIG. 3 is carried out using software. The personal computer includes a CPU 101, a read only memory (ROM) 102, a random access memory (RAM) 103, a bus 104, an input/output (I/O) interface 105, an input section 106, an output section 107, a memory 108, a communicating section 109, a drive 110, a magnetic disk 121, an optical disk 122, a magneto-optical disk 123, and a semiconductor memory 124. The CPU 101 controls the entire operation of the personal computer. When receiving a command from a user operating the input section 106 including a keyboard and a mouse via the bus 104 and the I/O interface 105, the CPU 101 executes the program stored in the ROM 102 in response to the command. The CPU 101 may load into the RAM 103 a program which has been read from the magnetic disk 121, the optical disk 122, the magneto-optical disk 123, or the semiconductor memory 124 connected to the drive 110 into the memory 108 and executes the program. In this manner, the function of the image converting section 21 can be carried out using software. Furthermore, the CPU 101 controls the communicating section 109 to communicate with external data for receiving and sending the data.

As shown in FIG. 19, the recording medium containing the program may be a package medium containing the magnetic disk 121 (including a flexible disk); the optical disk 122 (including a compact disc-read only memory, i.e., CD-ROM and a digital versatile disk, i.e., DVD); the magneto-optical disk 123 (including a mini-disc, i.e., MD); or the semiconductor memory 124 if such a program is supplied separately from a user's computer. The recording medium may be the ROM 102 or a hard disk of the memory 108 in a user's computer if the program on the recording medium is supplied preinstalled on the user's computer.

In the present invention, the steps of programs recorded on the recording medium may or may not be followed time-sequentially in order of described steps. Furthermore, the steps may be followed in parallel or independently from one another.

What is claimed is:

1. An image processing apparatus comprising:
   edge-extracting means for extracting edges of an input image composed of pixels in a matrix;
   period-detecting means for detecting periods of the edges;
   dividing means for dividing the input image into blocks according to the periods of the edges; and
   pixel-value converting means for converting the pixel values of all pixels in each of the blocks to a predetermined pixel value.

2. The image processing apparatus according to claim 1, further comprising:
   frequency-detecting means for detecting frequencies of pixels belonging to the edges extracted by the edge-extracting means in each of horizontal and vertical directions of the matrix,
   wherein the period-detecting means detects the periods of the edges in each of the horizontal and vertical directions of the matrix based on the frequencies of the pixels.

3. The image processing apparatus according to claim 1, further comprising:
   discrete Fourier transforming means for applying a discrete Fourier transform to the frequencies of the pixels belonging to the edges in each of the horizontal and vertical directions to produce respective power spectra; and
   peak-detecting means for detecting the spatial frequency at the peak in each of the power spectra,
   wherein the period-detecting means detects the periods of the edges based on the spatial frequencies at the peaks.

4. A method for processing an image, the method comprising:
   an edge-extracting step of extracting edges of an input image composed of pixels in a matrix;
   a period-detecting step of detecting periods of the edges;
   a dividing step of dividing the input image into blocks according to the periods of the edges;
   a pixel-value converting step of converting the pixel values of all pixels in each of the blocks to a predetermined pixel value; and
   an image storing step of storing the image including the pixels with converted pixel values on a computer readable medium.

5. A computer readable medium containing a program, the program comprising:
   an edge-extracting step of extracting edges of an input image composed of pixels in a matrix;
   a period-detecting step of detecting periods of the edges;
   a dividing step of dividing the input image into blocks according to the periods of the edges;
   a pixel-value converting step of converting the pixel values of all pixels in each of the blocks to a predetermined pixel value; and
   an image storing step of storing the image including the pixels with converted pixel values on a computer readable medium.

6. An image processing apparatus comprising:
   an edge-extracting unit configured to extract edges of an input image composed of pixels in a matrix;

a period-detecting unit configured to detect periods of the edges;

a dividing unit configured to divide the input image into blocks according to the periods of the edges; and a pixel-value converting unit configured to convert the pixel values of all pixels in each of the blocks to a predetermined pixel value.

7. The image processing apparatus according to claim 6, wherein the period detecting unit is configured to detect the periods of the edges corresponding to an interval at which edge pixels occur in the input image composed of pixels in a matrix.

8. The image processing apparatus according to claim 7, wherein the period detecting unit is configured to detect the interval at which the edge pixels occur in a vertical direction and a horizontal direction.

9. The image processing apparatus according to claim 8, wherein the period detecting unit is configured to detect the interval corresponding to a distance between edge pixels, in units of pixels, in the vertical direction or in the horizontal direction.

* * * * *